United States Patent
Hageman et al.

(10) Patent No.: US 8,820,057 B2
(45) Date of Patent: Sep. 2, 2014

(54) INCREASED FAN SPEED TO ASSIST DPF REGENERATION

(75) Inventors: Andrew J Hageman, Dyersville, IA (US); Brent A Smith, Peosta, IA (US); Nathan J Horstman, Durango, IA (US); Neil V Harber, Holly Cross, IA (US)

(73) Assignee: Deere & Company, Moline, IL (US)

( * ) Notice: Subject to any disclaimer, the term of this patent is extended or adjusted under 35 U.S.C. 154(b) by 547 days.

(21) Appl. No.: 13/075,860

(22) Filed: Mar. 30, 2011

(65) Prior Publication Data
US 2012/0247087 A1 Oct. 4, 2012

(51) Int. Cl.
*F01N 3/023* (2006.01)

(52) U.S. Cl.
USPC .............................. 60/295; 60/297

(58) Field of Classification Search
USPC .................... 60/274, 295, 311, 297
See application file for complete search history.

(56) References Cited

U.S. PATENT DOCUMENTS

| | | | |
|---|---|---|---|
| 6,349,882 B1 * | 2/2002 | Kita et al. ....................... | 236/34 |
| 6,481,388 B1 * | 11/2002 | Yamamoto ................. | 123/41.12 |
| 2006/0179826 A1 * | 8/2006 | Kuboshima et al. ........... | 60/297 |
| 2011/0000197 A1 * | 1/2011 | Kamiya et al. ................. | 60/295 |
| 2011/0072782 A1 * | 3/2011 | Ozawa et al. .................... | 60/273 |

FOREIGN PATENT DOCUMENTS

WO   WO 2009145081 A1 * 12/2009 ............... F10N 9/00

* cited by examiner

*Primary Examiner* — Kenneth Bomberg
*Assistant Examiner* — Jonathan Matthias
(74) *Attorney, Agent, or Firm* — Faegre Baker Daniels LLP

(57) ABSTRACT

A method and device for raising the temperature of exhaust gas from an engine by increasing parasitic loading on the engine without significantly increasing engine speed. This may be accomplished by increasing a demand on a hydraulic fan powered by a variable displacement hydraulic pump and meeting the demand by adjusting the displacement for the variable displacement hydraulic pump.

20 Claims, 2 Drawing Sheets

INCREASED FAN SPEED TO ASSIST DPF REGENERATION

FIELD OF THE INVENTION

This invention relates to internal combustion engines and, more particularly, to a system and method for regenerating particulate filters used to filter particulates from exhaust gases of these engines.

BACKGROUND OF THE INVENTION

In diesel and lean burn engines, particulate matter such as, for example, soot is present in exhaust gas from the engine at higher levels than normal gasoline engines. Under these conditions, i.e., higher levels of soot, manufacturers generally choose particulate filters to capture particulate matter. Particulate filters used to remove particulate matter from the exhaust gases of diesel engines are commonly called diesel particulate filters. Accumulated particulate matter such as soot within the filter may eventually reach an undesirable level and may, at this point, cause an undesirable drop in pressure across the diesel particulate filter. Undesirable levels of particulate matter in the DPF may necessitate a regeneration of the filter which may be, generally accomplished with an increase in temperature of exhaust gases to around 600° C. and above just prior to the exhaust gases entering the diesel particulate filter. At these temperatures, the exhaust gas may react with the soot, creating an exothermic reaction to oxidize or burn the soot away which increases the temperatures within the filter, enhancing the burning of the soot, as the soot is burned away.

One method of achieving regeneration temperatures is to increase the idle speed of the engine. However, there are times when such an option is not available or practical such as, for example, when vehicle operations demand a lower engine speed than that required for regeneration when exhaust gas temperature is dependent upon elevated engine speeds.

SUMMARY OF THE INVENTION

One example of a vehicle operation that may require lower engine speeds than required for regeneration is a motor grader performing a fine grading operation. In such an operation it may be desirable to regenerate the diesel particulate filter (hereinafter referenced as "DPF") with no increase in engine speed or with minimal increase in engine speed as the desired engine speed for fine motor grading is usually substantially lower than engine speeds required for regeneration when engine exhaust temperature is more directly dependent upon engine speed.

The invention includes a method of increasing parasitic load on the engine to increase exhaust gas temperature to a level sufficient to achieve regeneration without a concomitant increase in engine speed. To achieve the increase in parasitic load, a speed of a hydraulic fan for the cooling system of the machine may be increased beyond that required for the cooling needs of the machine. The desired fan speed may be a function of the current engine speed with the desired fan speed being higher at lower engine speeds and lower exhaust gas. In the event that the fan speed required for cooling is higher than the fan speed required for regeneration, the desired fan speed may be based upon cooling requirements.

DESCRIPTION OF THE PREFERRED EMBODIMENT

Figure 1:
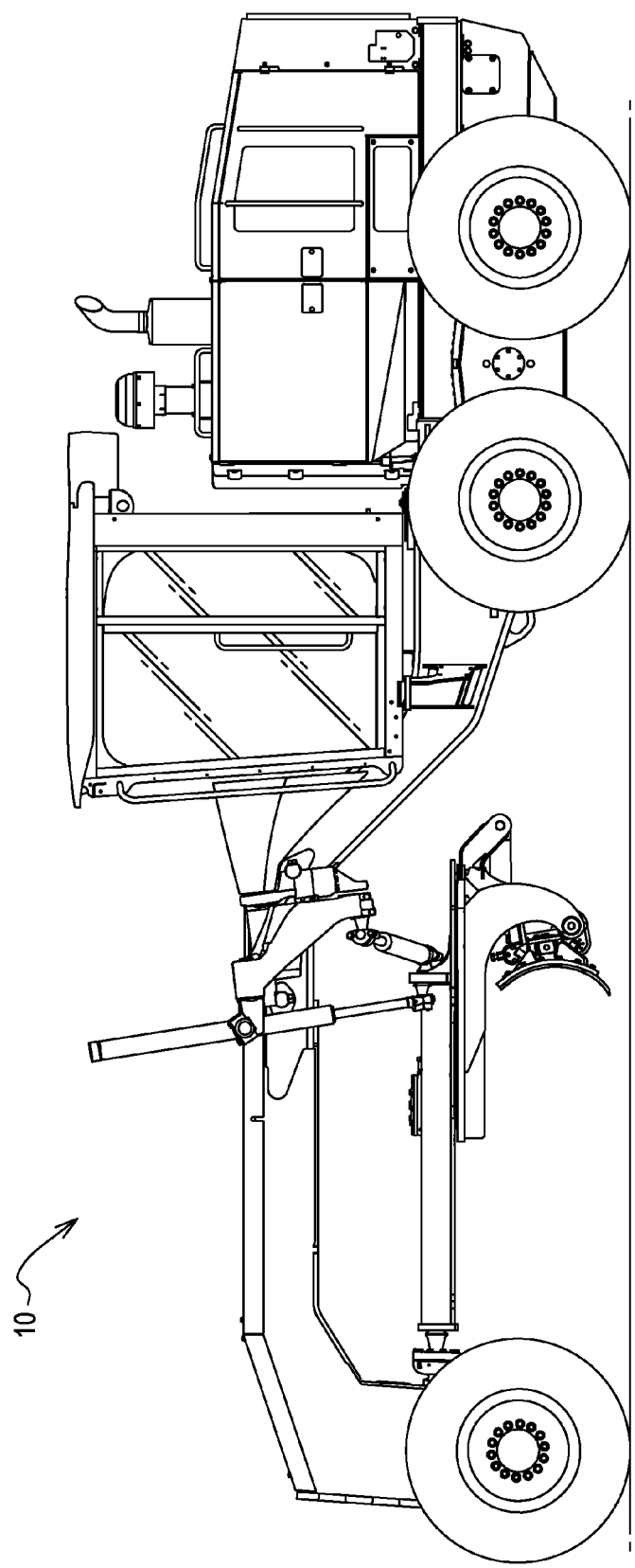
FIG. 1 is an exemplary illustration of a vehicle in which the invention may be used.

FIG. 1 is an exemplary illustration of a vehicle (motor grader 10) which, during vehicle operations, generally demands lower engine speeds than that required to raise exhaust gas temperatures to a level sufficient for DPF regeneration, and, thus, may benefit from use of the invention. Indeed, in such vehicles, the operation of fine grading may require very low engine speeds. Thus, when such vehicles are fine grading, an increase in engine speed to effect a required increase in exhaust gas temperature is not a practical option.

Figure 2:
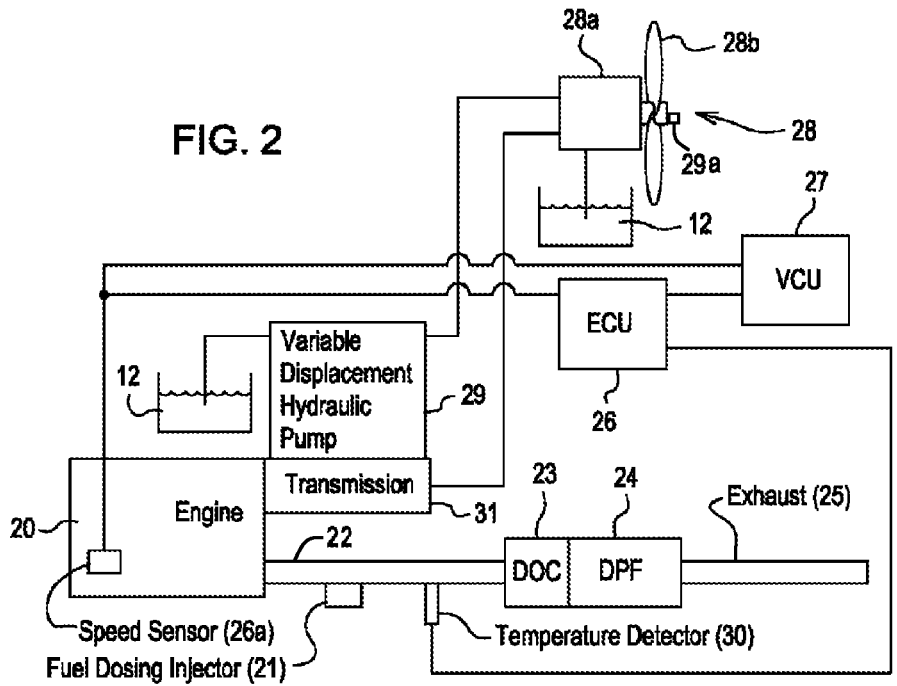
FIG. 2 illustrates an engine, fan and exhaust system in which the invention may be used.

FIG. 2 is an exemplary illustration of an exhaust system 100 utilizing the invention. It includes a diesel engine 20, a fuel dosing injector 21, an engine exhaust 22, a diesel oxidation catalyst ("DOC") 23, a DPF 24, a tailpipe 25, an engine control unit 26, a vehicle control unit 27, a fan 28 having a hydraulic fan motor 28a and fan blades 28b, and a fan power source, i.e., a variable displacement hydraulic pump 29, an exhaust gas temperature detector 30, and a transmission 31 to which the hydraulic pump 29 is operably connected.

As illustrated in FIG. 2, the exhaust gas temperature detector 30 is placed such that it measures the temperature of the exhaust gas prior to the exhaust gas coming into contact with the DOC 23. As illustrated, the exhaust gas emerges from the engine 20 then moves along the exhaust gas line 22 to the fuel dosing injector 21 and the temperature detector 30 where, if the exhaust gas temperature is equal to or greater than a minimum, predetermined value of, for example, 275° C., a predetermined amount of fuel based upon local exhaust gas temperature is injected into the exhaust gas. This mixture is then burned at the DOC 23 to increase the gas temperature to a level sufficient for regeneration of the DPF 24, a temperature of, for example, 600° C. At exhaust gas temperatures of around 600° C. and above, the exhaust gas may react with the soot in the DPF 24, creating an exothermic reaction increasing the temperatures within the DPF 24 as the soot is burned away. This creates even higher temperatures within the DPF 24 to enhance the regeneration process.

The ECU 26 shown in FIG. 2 may determine the need for regeneration of the DPF 24 by monitoring engine operation and exhaust gas temperatures over time and calculating the soot accumulated from a lookup table which includes values for first conditions under which soot is accumulated and values for second conditions under which soot is oxidized as well as values for amounts of soot accumulated or oxidized under first and second conditions over time. First conditions include conditions under which the temperatures of the exhaust gas fall under a predetermined value and second conditions include those in which the temperatures of the exhaust gas equal to or exceed the predetermined value. Thus, the calculated soot accumulated may be a function of a total of calculated soot accumulations over times during which conditions were suitable for given amounts of soot accumulation minus a total of calculated soot oxidized over times during which conditions were suitable for given amounts of soot oxidized. Regardless of the method used, the ECU 26, in this exemplary embodiment, determines the need for DPF regeneration and signals the VCU 27 that a regeneration of the DPF 24 is in progress. Once the VCU 27 receives the signal it begins to make fan speed adjustments as necessary.

The ECU 26 may signal the VCU 27 that a regeneration of the DPF 24 is in progress once the ECU 26 determines that the soot level is at a predetermined level and the vehicle is under working operations. The predetermined soot level may vary from vehicle to vehicle and may be set to different values by different designers but, for this particular embodiment, its value may be experimentally determined and may be associated with a slight decline in engine efficiency. The VCU 27, upon receiving the signal that a regeneration is in progress from the ECU 26, begins adjusting exhaust gas temperature by adjusting fan speed via displacement adjustment of the variable displacement hydraulic pump 29. In doing so, the VCU 27 uses a lookup table to find a predetermined value for a hydraulic fan speed suitable for increasing the temperature of the exhaust gas to a level sufficient for regeneration, i.e., for increasing the temperature of the exhaust gas to a value greater than 275° C. in this particular embodiment prior to contact with the DOC 23. The lookup table may be a cross reference of pump displacements and predetermined fan speeds for regeneration of the DPF 24. It may also include a cross reference between predetermined fan speeds and current engine speeds as the predetermined fan speed may be a function of engine speed. The lookup table may be empirically or theoretically developed. Once the predetermined fan speed is found or calculated, the VCU 27 may, via use of the lookup table, determine a required pump displacement for the predetermined fan speed. The VCU 27 may then send a signal to the variable displacement hydraulic pump 29 to set pump displacement to the required pump displacement for achieving the predetermined hydraulic fan speed for the hydraulic fan 28. The VCU 27 may monitor the fan speed, via signals from fan speed sensor 29a, incrementally adjusting the pump displacement until the speed of the hydraulic fan 28 is approximately equal to the requisite fan speed. The VCU 27 may continue to maintain the requisite predetermined hydraulic fan speed until either the ECU 26 determines and signals the VCU 27 that regeneration of the DPF 24 is complete and no longer in progress, or the fan speed for the cooling needs of the machine exceeds the predetermined fan speed. Increasing pump displacement to achieve a required fan speed may result in an increased load on the engine 20 with a consequential rise in exhaust gas temperature and little or no change in engine speed. This is especially beneficial for machinery requiring low engine speeds for work operations.

Figure 3:
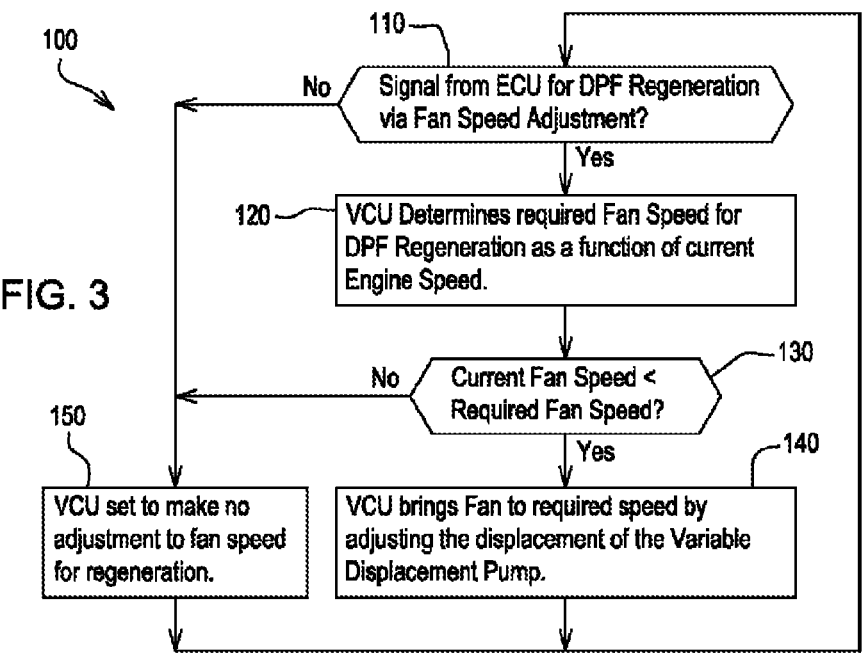
FIG. 3 is a flowchart illustrating an exemplary embodiment of the workings of the invention.

FIG. 3 illustrates an exemplary embodiment of the workings of the invention via a flowchart 40. As illustrated, if the ECU 26 signals a DPF regeneration via fan speed adjustment at 110, the VCU 27 determines at 120 the predetermined, i.e., the required fan speed required for DPF regeneration, i.e., for raising the current exhaust gas temperature to the exhaust gas temperature required to effect regeneration, i.e., at least 275° C. in this embodiment. This may be accomplished by using the cross reference between predetermined fan speeds and engine speeds in the lookup table. The VCU 27, then, at 130 determines if the current unadjusted fan speed is less than the required fan speed. If the current fan speed is less than the required fan speed, the VCU brings the fan to the required fan speed by adjusting the displacement of the variable displacement hydraulic pump 29 at 140. If, at any time, the current fan speed is greater than or equal to the required fan speed at 130, the VCU 27 makes no adjustment to the displacement, i.e., the current fan speed is not adjusted. In this embodiment, the process of displacement for the sake of regeneration stops when the signal for regeneration from the ECU 26 ceases, either due to a determination by the ECU 26 that the regeneration of the DPF 24 is complete or for some other reason, e.g., the ignition is turned off.

Having described the preferred embodiment, it will become apparent that various modifications can be made without departing from the scope of the invention as defined in the accompanying claims.

The invention claimed is:

1. A method of diesel particulate filter regeneration in a machine having an engine, a diesel particulate filter, a transmission, a variable displacement pump functionally connected to the transmission, and a hydraulic fan having a hydraulic motor in communication with the variable displacement hydraulic pump, comprising the steps of:
   monitoring a temperature of exhaust gas as the exhaust gas exits the engine;
   monitoring a hydraulic fan speed;
   monitoring the engine speed;
   determining a required fan speed for increasing a current exhaust gas temperature to a temperature required for regeneration of the diesel particulate filter, wherein the required fan speed is a function of the engine speed; and
   increasing the fan speed to the required fan speed by increasing a displacement for the variable displacement hydraulic pump.

2. The method of claim 1, wherein the required fan speed is determined via the use of a cross reference between engine speeds and required fan speeds.

3. The method of claim 1, wherein the required fan speed is inversely related to the engine speed such that the required fan speed is higher at a lower engine speed.

4. The method of claim 1, wherein the increasing step does not increase the engine speed.

5. The method of claim 1, wherein the increasing step occurs when the machine is under working operations.

6. The method of claim 1, wherein the step of monitoring the temperature of the exhaust gas occurs before the exhaust gas reaches the diesel particulate filter.

7. The method of claim 1, wherein the temperature required for regeneration of the diesel particulate filter is 600° C.

8. The method of claim 1, further comprising the step of determining a need for regeneration of the diesel particulate filter by:
   determining an amount of soot accumulated over times during which conditions were suitable for accumulating soot; and
   subtracting an amount of soot oxidized over times during which conditions were suitable for oxidizing soot.

9. The method of claim 1, wherein determining the required fan speed involves using a lookup table.

10. The method of claim 1, further comprising the step of maintaining the required fan speed for regeneration of the diesel particulate filter until either:
   the regeneration of the diesel particulate filter is complete; or
   the required fan speed for cooling the machine increases above the required fan speed for regeneration of the diesel particulate filter.

11. A method of filter regeneration in a machine having an engine, a filter, a transmission, a variable displacement pump functionally connected to the transmission, and a hydraulic fan having a hydraulic motor in fluid communication with the variable displacement pump, comprising the steps of:
   monitoring a temperature of engine exhaust gas;
   monitoring a current engine speed;
   monitoring a current hydraulic fan speed;
   using the current engine speed to determine a required fan speed for increasing a current exhaust gas temperature to a temperature required for regeneration of the filter;

determining a required displacement for the variable displacement hydraulic pump to effect the required fan speed without a speed increase on an input side of the variable displacement hydraulic pump; and adjusting the displacement of the variable displacement hydraulic pump to the required displacement.

12. The method of claim 11, wherein the machine is a motor grader, the method further comprising the step of performing a fine grading operation.

13. The method of claim 11, wherein the required fan speed for regeneration of the filter exceeds a required fan speed for cooling the machine.

14. The method of claim 13, further comprising the step of maintaining the required fan speed for regeneration of the filter until either:

the regeneration of the filter is complete; or the required fan speed for cooling the machine increases above the required fan speed for regeneration of the filter.

15. The method of claim 11, wherein the adjusting step increases the displacement of the variable displacement hydraulic pump to the required displacement in order to increase the fan speed to the required fan speed.

16. The method of claim 15, wherein the increasing step occurs when the machine is under working operations.

17. The method of claim 11, wherein the required fan speed is inversely related to the current engine speed such that the required fan speed is higher at a lower current engine speed.

18. The method of claim 11, wherein the step of monitoring the temperature of the engine exhaust gas occurs before the exhaust gas reaches the filter.

19. The method of claim 11, wherein the temperature required for regeneration of the filter is 600° C.

20. The method of claim 11, further comprising the step of determining a need for regeneration of the filter by:

determining an amount of soot accumulated over times during which conditions were suitable for accumulating soot; and subtracting an amount of soot oxidized over times during which conditions were suitable for oxidizing soot.

* * * * *